United States Patent [19]
Choi

[11] Patent Number: 5,675,698
[45] Date of Patent: Oct. 7, 1997

[54] AUTOMATIC HEAD SWITCHING CONTROL METHOD AND APPARATUS FOR MULTI-MODAL VIDEO CASSETTE RECORDERS

[75] Inventor: Nag-eui Choi, Ansan, Rep. of Korea

[73] Assignee: Samsung Electronics Co., Ltd., Kyungki-do, Rep. of Korea

[21] Appl. No.: 536,351

[22] Filed: Sep. 29, 1995

[30] Foreign Application Priority Data

Sep. 29, 1994 [KR] Rep. of Korea .............. 94-24835

[51] Int. Cl.[6] .................................................. H04N 9/79
[52] U.S. Cl. .................................................. 386/131; 360/61
[58] Field of Search ............................... 360/77.12, 77.01, 360/75, 64, 61, 33.1, 36.1, 27; 358/310, 324, 335, 312, 330; 348/443, 454, 457; 386/85, 86, 87, 89, 95, 96, 97, 131, 35, 124, 125, 126; H04N 9/79, 7/01, 11/20

[56] References Cited

U.S. PATENT DOCUMENTS

| | | | |
|---|---|---|---|
| 3,862,355 | 1/1975 | Guisinger | 358/316 |
| 4,163,993 | 8/1979 | Ravizza | 360/10 |
| 4,466,022 | 8/1984 | Ota | 358/330 |
| 4,500,930 | 2/1985 | Hamalainen et al. | 358/310 |
| 4,614,980 | 9/1986 | Ninomiya et al. | 358/335 |
| 4,730,222 | 3/1988 | Schauffele | 358/310 |
| 5,231,548 | 7/1993 | Yamada et al. | 360/70 |

*Primary Examiner*—Tommy P. Chin
*Assistant Examiner*—Y. Lee
*Attorney, Agent, or Firm*—Sughrue, Mion, Zinn, Macpeak and Seas

[57] ABSTRACT

An automatic head switching control method and apparatus in a multi-modal VCR for allowing automatic switching between a first and a second video modes (e.g., NTSC and PAL) without manual adjustment. The invention generates a head switching signal of which the head switching point of time of each head is shifted by delay data which is adapted for a first mode when the broadcast mode is the first mode. It also generates a head switching signal of which the head switching point of time of each head is shifted by corrected delay data obtained by correcting the delay data adapted for the first mode with an offset correction value when the broadcast mode is the second mode. As a result, there is no requirement for a manual adjustment and control time is shortened by maintaining the uniform velocity of the drum motor during automatic control.

9 Claims, 5 Drawing Sheets

AUTOMATIC HEAD SWITCHING CONTROL METHOD AND APPARATUS FOR MULTI-MODAL VIDEO CASSETTE RECORDERS

BACKGROUND OF THE INVENTION

The present invention relates to a head switching control apparatus and method for use in a multi-modal video cassette recorder.

A multi-modal video cassette recorder (VCR) means a VCR in which signals of both an NTSC type broadcast and a PAL type broadcast can be recorded and reproduced using a single VCR.

The head switching control is necessary to maintain a uniform relative position between a video head attached to a drum and a video signal recorded on a tape, when one frame is formed of signals picked up by a plurality of heads.

In a VHS system, the head switching point of time of the head switching signal leads a vertical sync signal $V_{SYNC}$ by 6.5±1.5H in which H represents a horizontal sync signal pulse period.

To record and reproduce both the NTSC and PAL type broadcast signals in a single VCR, a method for generating a head switching signal appropriate for each type broadcast signal is required in the multi-modal VCR.

In a manual type head switching control apparatus for a conventional multi-modal VCR, the resistance in a monostable multivibrator (which comprises a variable resistor and a capacitor) is varied to adjust a time constant ($t_{MM}$) of the monostable multivibrator. As a result, a head switching signal adapted for each type broadcast system (NTSC or PAL) has been generated.

FIG. 1 shows a waveform timing diagram of waveforms (A) through (E) showing a process of producing a head switching signal by a manual head switching control method in the conventional multi-modal VCR.

Waveform (A) of FIG. 1 shows a drum phase generation (DPG) signal and waveform (B) shows a drum frequency generation (DFG) signal, which are generated from a head drum, respectively. Waveform (C) of FIG. 1 shows a waveform for determining a head switching point of time. Waveform (D) of FIG. 1 shows a head switching signal and waveform (E) shows a vertical sync signal $V_{SYNC}$ of a video signal. Referring to waveforms (D) and (E), since the head switching signal leads the vertical sync signal by 6.5H, it can be seen that the head switching signal is adapted for the VHS system.

Here, two delay times of $t_{fs}$ and $t_{ROM}$ are fixed values once a drum assay is assembled, which have respectively different values in the NTSC and PAL systems. Also, since a time of one "H" is different from each other in the NTSC and PAL systems, a value of a time interval (6.5H) between the head switching signal and vertical sync signal $V_{SYNC}$ differs in each system.

As described above, in a manual type head switching control apparatus for a conventional multi-modal VCR, a time constant ($t_{MM}$) of a monostable multivibrator is controlled to generate a head switching signal adapted for each type broadcast system.

FIGS. 2A and 2B show circuits for controlling a value of $t_{MM}$ in the manual head switching control apparatus in the conventional multi-modal VCR.

The FIG. 2A circuit is composed of a variable resistor and a capacitor, in which $t_{MM}$ equals $R_1 \cdot C_1 \cdot \ln 2$, since a threshold voltage $V_{th}$ for triggering a monostable multivibrator is ½× $V_{DD}$. Here, function "ln" represents a natural logarithmic function, $R_1$ is a resistance value of the variable resistor and $C_1$ is a capacitance value of the capacitor.

Thus, in case of the FIG. 2A circuit, a resistance value $R_1$ of the variable resistor is varied according to each system to obtain $t_{MM}$ corresponding to the NTSC and PAL systems, respectively. Accordingly, manual adjustment should be performed two times.

The FIG. 2B circuit is composed of two variable resistors, a switch and a capacitor. When the switch is open, $t_{MM}$ equals $R_1 \cdot C_1 \cdot \ln 2$, while when the switch is closed, $t_{MM}$ equals $(R_1//R_2) \cdot C_1 \cdot \ln 2$. In case of the FIG. 2B circuit, $R_1$ is determined so that $t_{mm} = R_1 \cdot C_1 \cdot \ln 2$ is adapted for the NTSC system at the switch-off state, while $R_2$ is determined with respect to the predetermined $R_1$ so that $t_{MM} = (R_1//R_2) \cdot C_1 \cdot \ln 2$ is adapted for the PAL system at the switch-on state. Here, $(R_1//R_2)$ represents a resultant resistance value of two parallel resistors.

Thus, the FIG. 2B circuit has two resistors of which the values are determined by the above method, and provides $t_{MM}$ adapted for each system by an on or off operation of the switch.

However, a range of $t_{Mm}$ which can be adjusted by resistor values of $R_1$ and $R_2$ cannot cover a delay time to be corrected in the multi-modal VCR which is manufactured by an actual manufacturing process.

SUMMARY OF THE INVENTION

Therefore, to solve the above problems, it is an object of the present invention to provide an automatic head switching control method and apparatus for use in a multi-modal VCR, which detects whether an interval between a head switching point of time and a vertical sync signal is within a predetermined range, and uses delay data in order to automatically control a head switching signal adapted for a first mode, while when converting a current mode into a second mode, delay data corrected by an offset correction value is used to generate a head switching signal adapted for the second mode, thereby making a manual adjustment unnecessary.

The other object of the present invention is to provide an automatic head switching control method and apparatus for use in a multi-modal VCR, which alters only a head switching point of time of one head among a plurality of heads attached to a drum while finding delay data meeting a format, and then maintains the consistent velocity of the drum motor during an automatic control of a head switching operation, thereby shortening a control time.

Thus, to accomplish the above object of the present invention, there is provided an automatic head switching control apparatus for use in a multi-modal VCR comprising:
a drum reference counter for generating a reference signal according to broadcast mode information to control a drum phase; a head switching signal generator for generating a head switching signal according to the broadcast mode information using a drum phase generation (DPG) signal and a drum frequency generation (DFG) signal applied from a drum, delay data and a shift command signal of a head switching point of time for each head; a format detector coupled to an output end of the head switching signal generator, for comparing the head switching signal with a vertical sync signal of a video signal and detecting whether an interval of time between both the head switching signal and the vertical sync signal meets a predetermined range; a controller for applying the broadcast mode information to the drum reference counter and head switching signal generator, and supplying the delay data and the shift command signal of the head switching point of time for each head to the head switching signal generator according to the output of the format detector; a storage portion for storing the delay data generated when the format detector judges that the format is met for the first mode and an offset correction value for obtaining delay data adapted for the second mode from the delay data adapted for the first mode; and a drum phase detector for comparing the head switching signal output from the head switching signal generator with the reference signal output from the drum reference counter to generate a drum phase control signal for altering velocity of the drum motor.

Also, an automatic head switching control method for use in a multi-modal VCR comprises the steps of:

1. Obtaining delay data adapted to a first mode while shifting a head switching point of time of only one head and storing delay data adapted for the first mode, and an offset correction value for obtaining delay data adapted for a second mode using the delay data adapted for the first mode.

2. Generating a head switching signal of which a head switching point of time for each head is shifted by the delay data adapted for the first mode when a broadcast mode is the first mode, and generating another head switching signal of which a head switching point of time for each head is shifted by delay data obtained by correcting the delay data adapted for the first mode using the offset correction value when a broadcast mode is the second mode; and controlling a drum motor according to the head switching signal.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings FIGS. 3 through 5B.

Two broadcast modes adapted in the present invention are referred to as a first mode and a second mode. First of all, it is assumed that after controlling a head switching operation to be adapted the second mode. A multi-modal VCR is classified into two types: one wherein the first mode is an NTSC broadcast mode and the second mode is a PAL broadcast mode; and the other one wherein the first mode is the PAL broadcast mode and the second mode is the NTSC broadcast mode.

Since the present invention relates to an automatic head switching control method and apparatus, a process of manufacturing a head switching signal during an automatic control thereof will be described.

Figure 1:
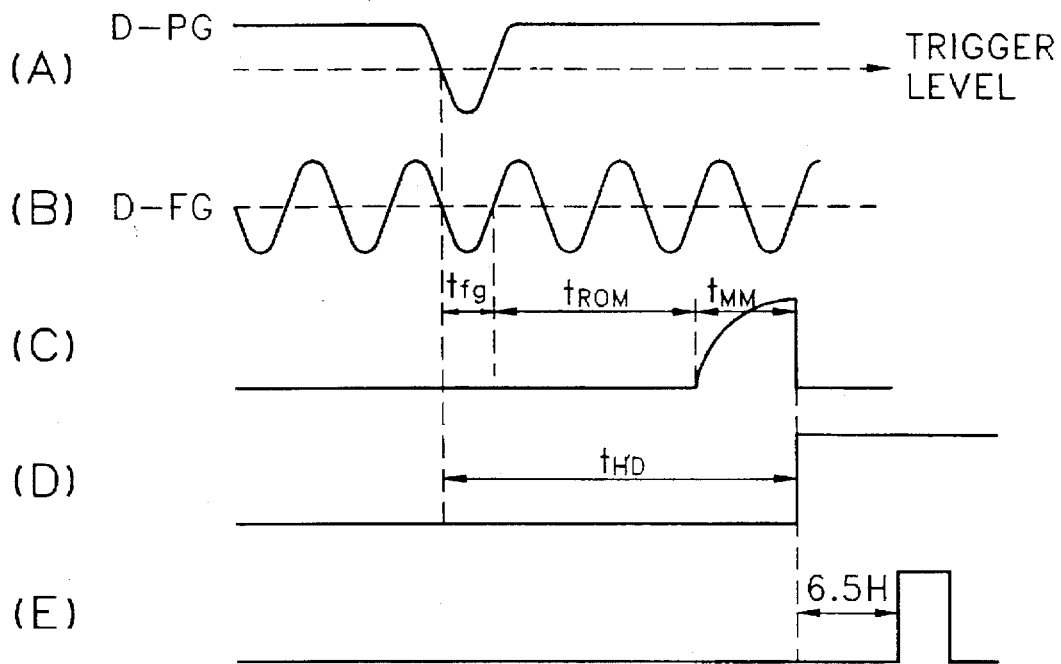
FIG. 1 is a waveform timing diagram of waveforms (A) through (E) showing a process of producing a head (A) through (E) showing a process of producing a head switching signal by a conventional manual head switching control method.
Figure 2:
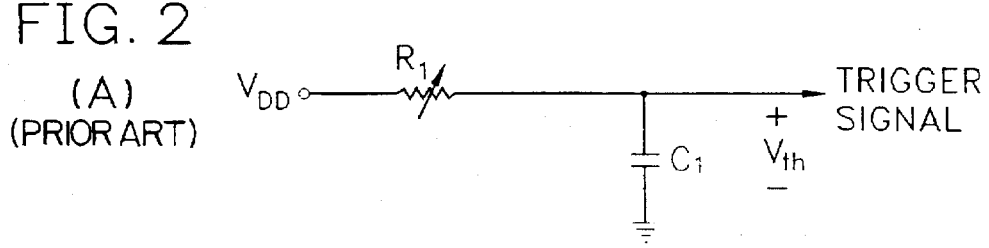
FIGS. 2A and 2B are circuit diagrams for controlling $t_{MM}$ in a conventional manual head switching control apparatus.
Figure 2:
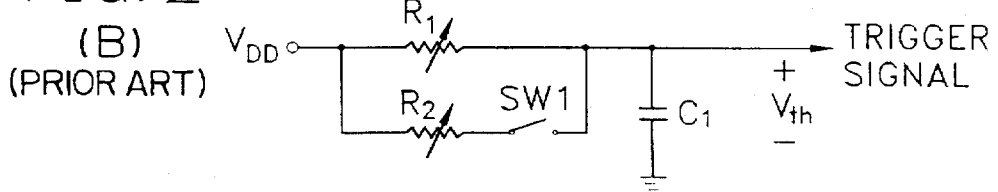
Figure 3:
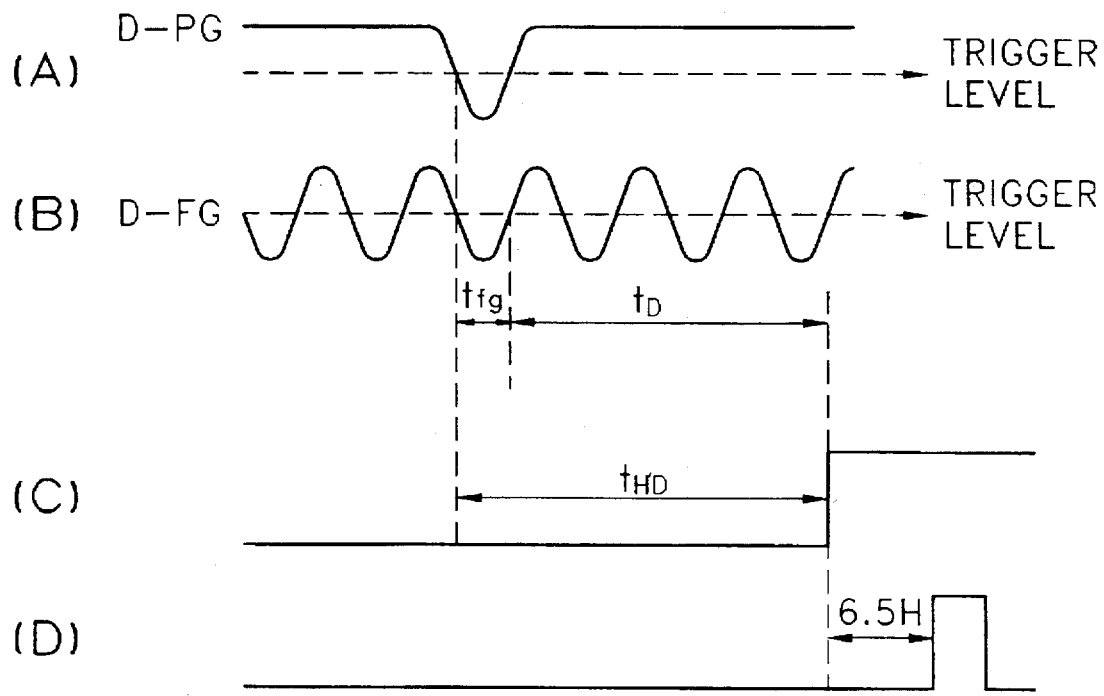
FIG. 3 is a waveform timing diagram of waveforms (A) through (D) showing a process in which a head switching signal is automatically produced in an automatic head switching control apparatus for a multi-modal VCR according to the present invention.

FIG. 3 shows a waveform timing diagram for waveforms (A) through (D) showing a process in which a head switching signal is automatically produced in an automatic head switching control apparatus for a multi-modal VCR according to the present invention.

Waveform (A) of FIG. 3 shows a DPG signal generated in a head drum. Waveform (B) of FIG. 3 shows a DFG signal. Waveform (C) of FIG. 3 shows a head switching signal for determining a head switching point of time. Waveform (D) of FIG. 3 shows a vertical sync signal of a video signal. The head switching point of time of the head switching signal should lead the vertical sync signal of the video signal by 5H to 8H (i.e., 6.5H±1.5H). In waveforms (C) and (D) of FIG. 3, the head switching signal leads the vertical sync signal by 6.5H.

An interval $t_{HD}$ for determining the head switching point of time is determined by a time $t_{fg}$ from a falling edge of the DPG signal to a first rising edge of the DFG signal and a delay time $t_D$ which is determined by head switching delay data which is controlled by a controller.

The relationship between the head switching delay data (hereinafter referred to as the delay data) and the delay time follows an equation $$t_D = \frac{(N+1) \cdot 32}{f_{sc}} \qquad (1)$$

Here, $t_D$ is a delay time, N is delay data of which the unit is one byte (8 bits), and $f_{sc}$ is a color subcarrier sync frequency.

Since time $t_{fg}$ is a fixed value in a drum system, an automatic head switching control represents that the delay data varies step wisely and delay time $t_D$ is controlled by the controller, in order to match a head switching point of time.

In a multi-modal VCR, $t_{fg}$ and $f_{sc}$ differ in the NTSC and PAL modes, respectively and a time of one horizontal sync signal pulse period (1H) differs according to a format of each mode. Accordingly, delay data adapted for each mode differs. Thus, the automatic head switching control in the multi-modal VCR represents that the delay data adapted for each mode is obtained and a head switching operation is controlled by the head switching signal for each mode according to the adapted delay data.

In the present invention, the delay data adapted for the first mode is obtained and the other delay data adapted for the second mode is obtained by correcting the delay data adapted for the first mode with the offset correction value.

The offset correction value for obtaining the delay data adapted for the second mode with the delay data adapted for the first mode can be obtained by considering a difference of the rotational speeds between drum systems and a difference between bit resolutions of the respective modes.

The rotational velocity of the drum is 92.6 µs/1° for the NTSC mode and 111.1 µs/1° for the PAL mode. The bit resolution is 8.94 µs/1 bit for the NTSC mode and 7.22 µs/1 bit for the PAL mode.

Thus, the offset correction value for obtaining the delay data adapted for the PAL mode from the delay data adapted for the NTSC mode can be obtained by the following equation (2).

$$D_N \cdot \frac{111.1}{92.6} \cdot \frac{8.94}{7.22} = D_P \qquad (2)$$

That is, $D_N \times 1.4856 = D_P$.

Here, $D_N$ is the delay data adapted for the NTSC mode and $D_P$, is the delay data adapted for the PAL mode.

According to equation (2), the offset correction value for obtaining the delay data adapted for the PAL mode from the delay data adapted for the NTSC mode is 1.4856. Reversely, the offset correction value for obtaining the delay data adapted for the NTSC mode from the delay data adapted for the PAL mode is 1/1.4856, that is, 0.6731.

Figure 4:
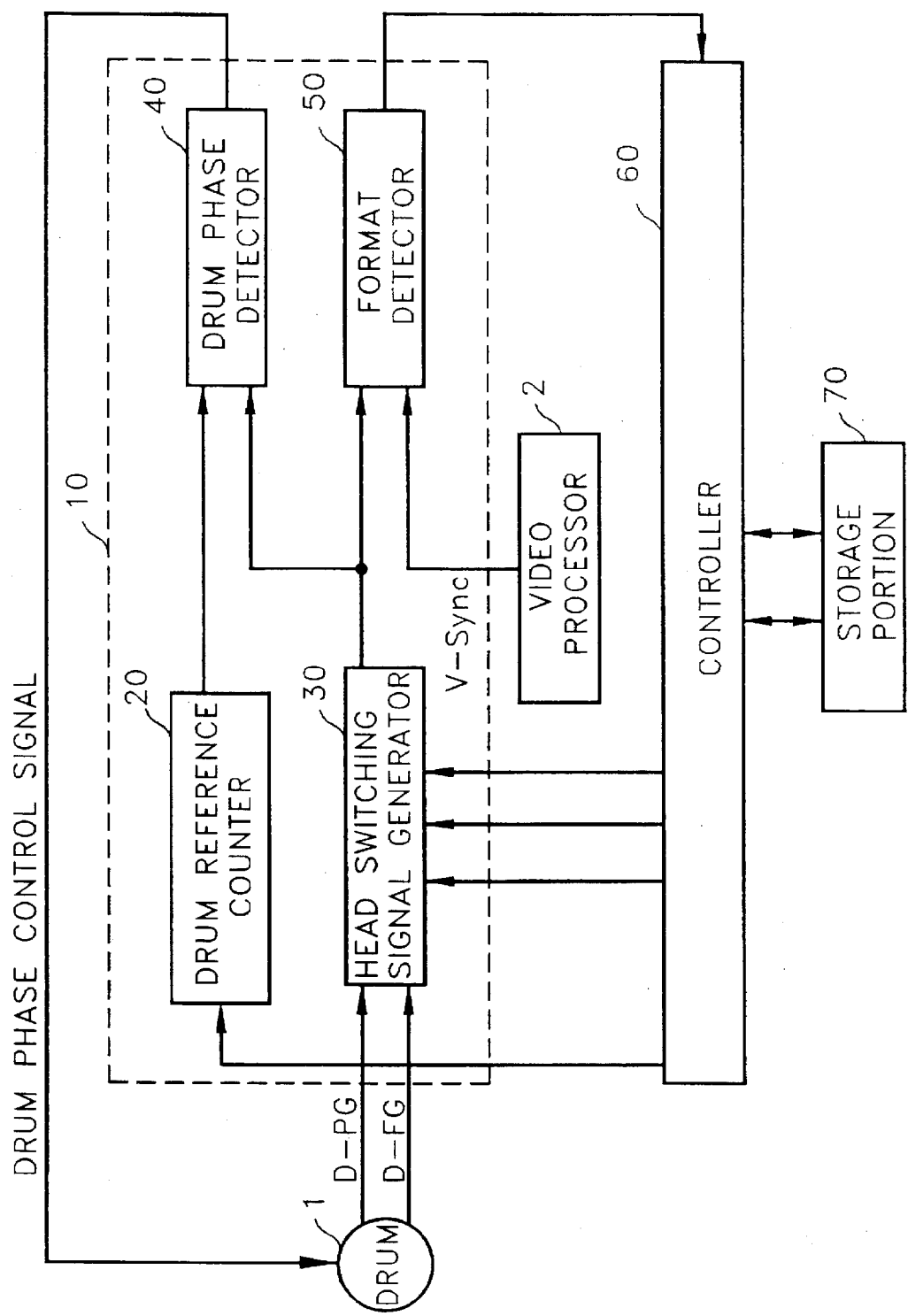
FIG. 4 is a block diagram of the automatic head switching control apparatus in a multi-modal VCR according to the present invention.

FIG. 4 is a block diagram of the automatic head switching control apparatus in a multi-modal VCR according to the present invention.

In FIG. 4, a drum reference counter 20 produces a reference signal having a frequency of 30 Hz in the NTSC mode and 25 Hz in the PAL mode according to the mode information applied from a controller 60, and outputs the reference signal to a drum phase detector 40. A head switching signal generator 30 generates a head switching signal having a frequency of 30 Hz in the NTSC mode and 25 Hz in the PAL mode according to the mode information applied from controller 60. A head switching point of time of the head switching signal according to each mode is determined by a drum phase generation signal DPG and a drum frequency generation signal DFG input from drum 1, head switching delay data applied from controller 60, and a shift command signal of the head switching point of time for each head. The head switching signal output from the head switching signal generator 30 is input to drum phase detector 40 and a format detector 50, respectively.

Format detector 50 connected to the output end of head switching signal generator 30 compares the head switching signal with a vertical sync signal applied from video processor 2, detects whether an interval of time between the head switching point of time of the head switching signal and the vertical sync signal is within a predetermined range, and outputs the detection result to controller 60.

In the VHS system, the head switching points of time of the head switching signals in both the first and second modes lead the vertical sync signal by 6.5H±1.5H, that is, 5H through 8H.

Controller 60 applies mode information representing first mode to drum reference counter 20 and head switching signal generator 30, to determine delay data adapted for the first mode. Controller 60 alters the first mode delay data stepwisely and applies a signal for shifting only a head switching point of time of one head by the altered delay data to head switching signal generator 30, together with the altered delay data.

Three operations are repetitively performed until format detector 50 judges the format is met. These operations are: (1) the alteration of the first mode delay data by controller 60, (2) the generation of the first mode head switching signal of which the head switching point of time of one head only is shifted, and (3) the detection of format detector 50.

The features of the present invention reside in a fact that the velocity of the drum motor does not vary during repeating the above processes. The reason is that the output signal of drum phase detector 40 is constant during alteration of the head switching point of time only with respect to one head. Drum phase detector 40 compares the head switching signal with the reference signal and functions to remove an error between the head switching signal and the reference signal. Since the alteration of the head switching point of time only with respect to one head represents that only a pulse duty is altered while maintaining a uniform frequency of the head switching signal, the output of drum phase detector 40 becomes constant.

If format detector 50 judges that the format is met, controller 60 stores the delay data $D_1$ adapted for the first mode, and an offset correction value $f_{21}$ for obtaining the second mode delay data $D_2$ from the first mode delay data, in storage portion 70. The storage portion 70 preferably is an EEPROM. As described above, when the first mode is the NTSC mode and the second mode is the PAL mode, a value of 1.4856 is stored as an offset correction value. When the first mode is the PAL mode and the second mode is the NTSC mode, a value of 0.6731 is stored as an offset correction value.

When a broadcast mode is the first mode, controller 60 outputs a mode signal representing that the current mode is the first mode, the stored delay data $D_1$, and a signal for shifting the head switching point of time for each head by the delay data, to the head switching signal generator 30. When a broadcast mode is the second mode, controller 60 outputs a mode signal representing that the current mode is the second mode, the corrected delay data $D_2 = (D_1 \cdot f_{21})$ by correcting the stored delay data $D_1$ with the offset correction value, and a signal for shifting the head switching point of time for each head by the corrected delay data, to the head switching signal generator 30.

Drum phase detector 40 outputs a drum phase control signal for altering the velocity of the drum motor according to the head switching signal adapted for each head output from head switching signal generator 30, thereby performing a head switching operation.

As described above, the apparatus of the present invention automatically controls the head switching so as to be adapted to the first broadcast mode and the second broadcast mode.

Figure 5A:
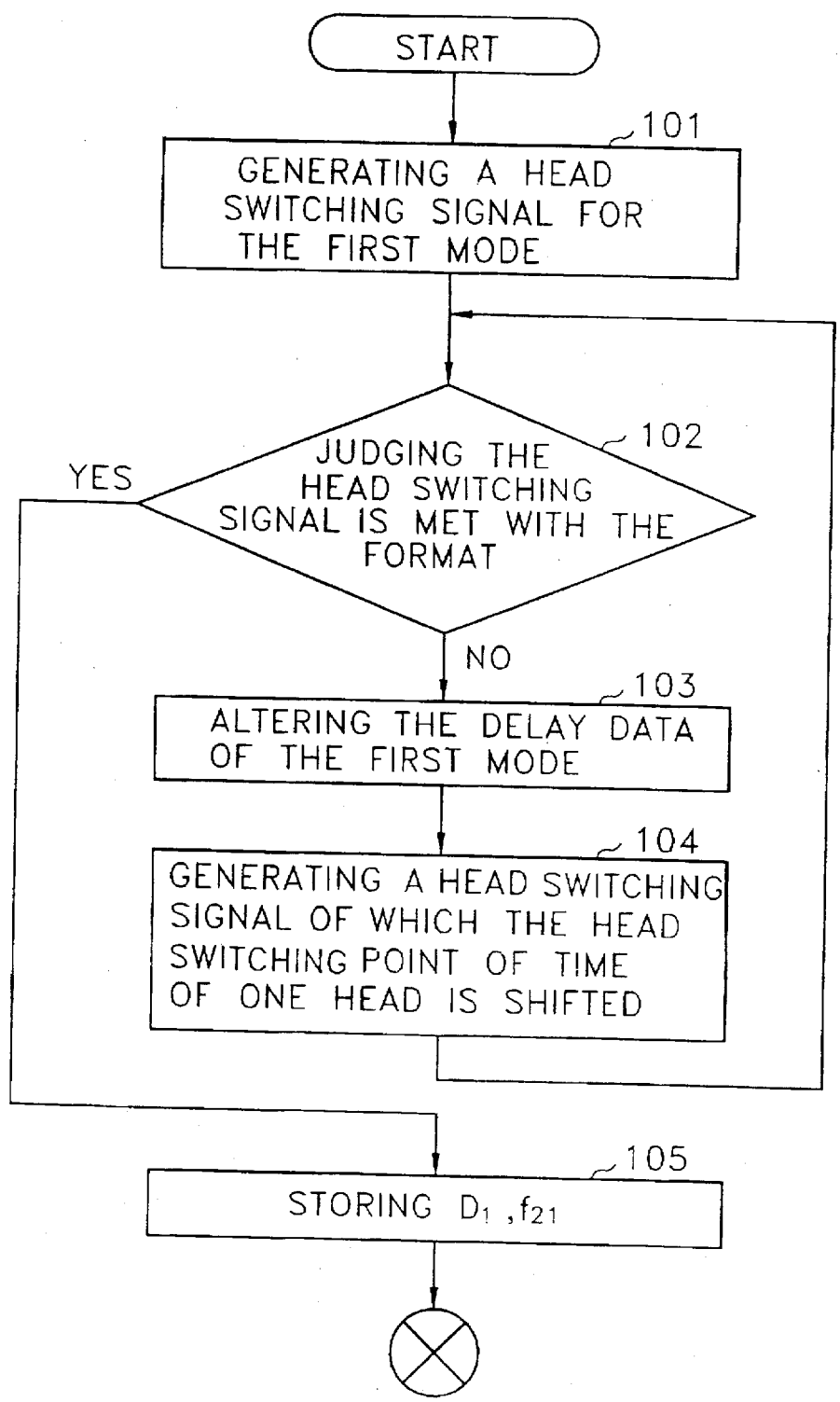
FIGS. 5A and 5B are a flow-chart diagram of an automatic head switching control method in a multi-modal VCR according to the present invention.
Figure 5B:
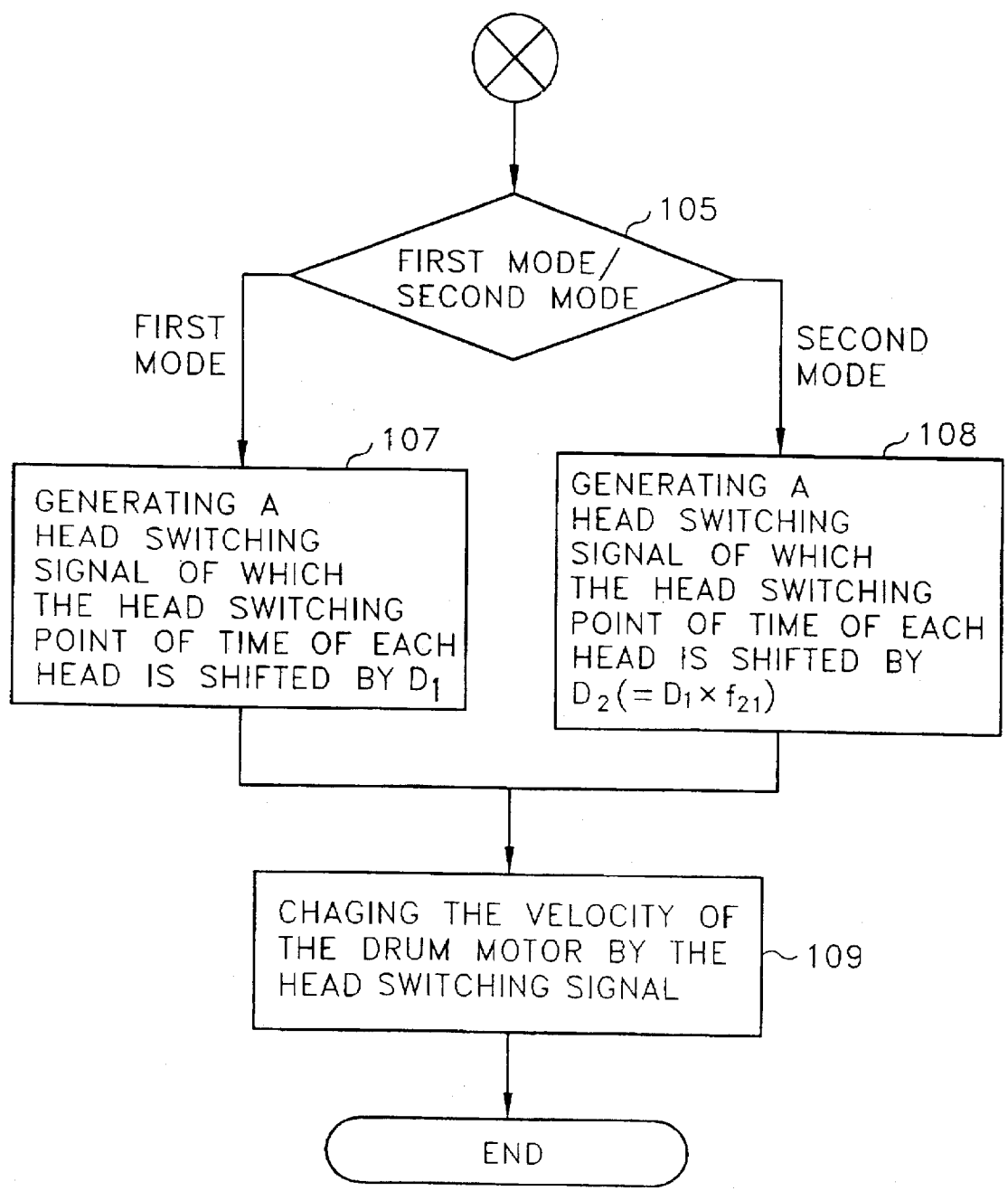

FIGS. 5A and 5B are a flow-chart diagram for explaining an automatic head switching control method in a multi-modal VCR according to the present invention.

In the flow-chart diagram of FIGS. 5A and 5B, a method for finding out delay data adapted for the first mode is performed while shifting only the head switching point of time of one head.

The method comprises the steps of generating a head switching signal with respect to the first mode (step 101), judging whether the head switching point of time of the head switching signal is met with the format (step 102), altering the delay data of the first mode (step 103), and generating a head switching signal of which the head switching point of time of one head is shifted by the altered delay data (step 104). In the case of the VHS system, a predetermined range in step 102 is 6.5H±1.5H for both the modes. The above steps 101, 102, 103 and 104 are repeated until it will be judged that the format has been met in step 102.

If it is judged that the head switching point of time meets a predetermined format in step 102, an offset correction value $f_{21}$ for obtaining delay data D, adapted for the first mode and delay data $D_2$ of the Second mode using the delay data $D_1$ is stored in step 105. As described above, when the first mode is the NTSC mode and the second mode is the PAL mode, a value of 1.4856 is stored as an offset correction value. When the first mode is the PAL mode and the second mode is the NTSC mode, a value of 0.6731 is stored as an offset correction value.

When the broadcast mode is the first mode, the head switching signal of which the head switching point of time of each head is shifted by delay data $D_1$ adapted for the first mode, is generated in step 107. When the broadcast mode is the second mode, the head switching signal of which the head switching point of time of each head is shifted by delay data $D_2$ of the second mode having a value $(D_1 \cdot f_{21})$ obtained by correcting delay data $D_1$ adapted for the first mode with the offset correction value $f_{21}$, is generated in step 108.

The velocity of the drum motor is changed by the head switching signal, thereby performing a head switching operation 109.

As described above, the automatic head switching control method and apparatus in a multi-modal VCR according to the present invention, obtains delay data adapted for a first mode while altering only a head switching point of time of one head, to generate a head switching signal of which the head switching point of time of each head is shifted by delay data adapted for the first mode when the broadcast mode is the first mode, and to generate a head switching signal of which the head switching point of time of each head is shifted by corrected delay data obtained by correcting the delay data adapted for the first mode with the offset correction value, thereby not requiring a manual adjustment and shortening a control time by maintaining the uniform velocity of the drum motor during an automatic control.

While only certain embodiments of the invention have been specifically described herein, it will apparent that numerous modifications may be made thereto without departing from the spirit and scope of the invention.

What is claimed is:

1. An automatic head switching control apparatus in a multi-modal VCR having a drum driven by a drum motor, said drum having a plurality of heads, said automatic head switching control apparatus comprising:

a drum reference counter for generating a reference signal according to broadcast mode information to control drum phase of the drum;

a head switching signal generator for generating a head switching signal according to the broadcast mode information using a drum phase generation (DPG) signal and a drum frequency generation (DFG) signal supplied from the drum, delay data, and a shift command signal of a head switching point of time for each head;

p1 a format detector, coupled to an output end of the head switching signal generator, for comparing the head switching signal with a vertical sync signal of a video signal and detecting whether an interval of time between both the head switching signal and the vertical sync signal is in a predetermined range to judge whether a format corresponding to a first mode is met;

a controller for applying the broadcast mode information to the drum reference counter and head switching signal generator, and supplying the delay data and the shift command signal of the head switching point of time for each head to the head switching signal generator according to the output of the format detector;

a storage portion for storing the delay data generated when the format detector judges that the format is met for said first mode and an offset correction value for obtaining delay data adapted for a second mode from the delay data adapted for said first mode; and a drum phase detector for comparing the head switching signal output from the head switching signal generator with the reference signal output from the drum reference counter to generate a drum phase control signal for altering velocity of the drum motor.

2. The automatic head switching control apparatus in a multi-modal VCR according to claim 1, wherein said controller applies a mode information signal representing the first mode, the stepwisely altered delay data and a signal for shifting the head switching point of time of one head to said head switching signal generator, until said format detector judges that the generated head switching signal meets the format, in order to find out the delay data adapted for the first mode.

3. The automatic head switching control apparatus in a multi-modal VCR according to claim 2, wherein said controller applies a mode information signal representing the first mode to said drum reference counter and said head switching signal generator, and applies the delay data adapted for the first mode and the signal for shifting each head to said head switching signal generator, in order to generate the head switching signal adapted for the first mode.

4. The automatic head switching control apparatus in a multi-modal VCR according to claim 3, wherein said controller applies a mode information signal representing the second mode to said drum reference counter and said head switching signal generator, and applies the delay data adapted for the second mode obtained by correcting the delay data adapted for the first mode with the offset correction value stored in said storage portion and the signal for shifting each head to said head switching signal generator, in order to generate the head switching signal adapted for the second mode.

5. The automatic head switching control apparatus in a multi-modal VCR according to claim 4, wherein said format detector judges whether the head switching point of time of the head switching signal leads the vertical sync signal of the video signal by a time period ranging from 5H through 8H in which H indicates a horizontal sync signal period, and detects whether the head switching signal is adapted for the VHS system.

6. The automatic head switching control apparatus in a multi-modal VCR according to claim 5, wherein said storage portion is an EEPROM.

7. The automatic head switching control apparatus in a multi-modal VCR according to claim 6, wherein said offset correction value stored in said storage portion is a value for calculating delay data adapted for the second mode by multiplying the delay data adapted for the first mode by the offset correction value.

8. The automatic head switching control apparatus in a multi-modal VCR according to claim 7, wherein said first mode is the NTSC mode and said second mode is the PAL mode, and wherein said offset correction value stored in said storage portion is 1.4856.

9. The automatic head switching control apparatus in a multi-modal VCR according to claim 7, wherein said first mode is the PAL mode and said second mode is the NTSC mode, and wherein said offset correction value stored in said storage portion is 0.6731.

* * * * *